US010000212B2

(12) United States Patent
Oh et al.

(10) Patent No.: US 10,000,212 B2
(45) Date of Patent: Jun. 19, 2018

(54) VEHICLE AND METHOD FOR CONTROLLING DISTANCE BETWEEN TRAVELING VEHICLES

(71) Applicant: Hyundai Motor Company, Seoul (KR)

(72) Inventors: Youngchul Oh, Gyeonggi-do (KR); Hyoung Geun Kwon, Gyeonggi-do (KR); Kicheol Shin, Gyeonggi-do (KR); MyungSeon Heo, Seoul (KR); Byungyong You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/087,085

(22) Filed: Mar. 31, 2016

(65) Prior Publication Data

US 2017/0106861 A1  Apr. 20, 2017

(30) Foreign Application Priority Data

Oct. 15, 2015 (KR) .................. 10-2015-0143937

(51) Int. Cl.
*B60W 30/14* (2006.01)
*B60W 30/16* (2012.01)

(52) U.S. Cl.
CPC .......... *B60W 30/143* (2013.01); *B60W 30/16* (2013.01); *B60W 2550/146* (2013.01); *B60W 2550/302* (2013.01); *B60W 2550/308* (2013.01); *B60W 2720/10* (2013.01)

(58) Field of Classification Search
CPC ......... B60W 30/143; B60W 2550/146; B60W 2550/302; B60W 2550/308
See application file for complete search history.

(56) References Cited

U.S. PATENT DOCUMENTS

| 2001/0037165 A1* | 11/2001 | Shirai | ................... B60W 30/16 |
| | | | 701/1 |
| 2003/0195704 A1* | 10/2003 | Sekiguchi | ............. B60W 30/16 |
| | | | 701/301 |
| 2004/0061626 A1* | 4/2004 | Kubota | .............. B60K 31/0008 |
| | | | 701/96 |
| 2004/0176900 A1* | 9/2004 | Yajima | ............... B60K 31/0008 |
| | | | 701/96 |

(Continued)

FOREIGN PATENT DOCUMENTS

JP    H10338055 A    12/1998
JP    3327217 B2    9/2002

(Continued)

*Primary Examiner* — Rodney A Butler
(74) *Attorney, Agent, or Firm* — Mintz Levin Cohn Ferris Glovsky and Popeo, P.C.; Peter F. Corless

(57) ABSTRACT

A vehicle and a method for controlling the same are provided to determine a traveling speed based on travel information of a first preceding vehicle and a second preceding vehicle. The vehicle includes a drive unit that provides rotational force for vehicle traveling and a distance sensor that detects an object located in a forward direction. A controller first preceding vehicle and a second preceding vehicle located ahead of the first preceding vehicle, which travel on the same traffic road as a traveling road based on the result detected by the distance sensor. The drive unit is operated to adjust a vehicle speed to be at a traveling speed determined based on travel information of the first preceding vehicle and the second preceding vehicle.

16 Claims, 11 Drawing Sheets

(56) References Cited

U.S. PATENT DOCUMENTS

| | | | |
|---|---|---|---|
| 2005/0171675 A1* | 8/2005 | Sawamoto | B60K 31/0008 701/96 |
| 2006/0155469 A1* | 7/2006 | Kawasaki | B60R 21/013 701/301 |
| 2010/0198477 A1* | 8/2010 | Shirai | B60K 31/0008 701/96 |
| 2012/0200450 A1* | 8/2012 | Ishimori | G01S 13/931 342/70 |
| 2013/0179379 A1* | 7/2013 | Kurumisawa | G06N 5/02 706/46 |
| 2015/0112580 A1* | 4/2015 | Sudou | B60K 31/0008 701/300 |
| 2016/0200319 A1* | 7/2016 | Nemoto | B60W 10/04 701/96 |
| 2017/0015313 A1* | 1/2017 | Mei | B60W 30/09 |

FOREIGN PATENT DOCUMENTS

| | | | |
|---|---|---|---|
| JP | 2004030195 A | 1/2004 |
| JP | 2004038820 A | 2/2004 |
| JP | 2007176290 A | 7/2007 |
| JP | 2009227256 A | 10/2009 |
| JP | 4371001 B2 | 11/2009 |
| JP | 2013-061274 A | 4/2013 |
| KR | 10-1511860 B1 | 4/2015 |

* cited by examiner

VEHICLE AND METHOD FOR CONTROLLING DISTANCE BETWEEN TRAVELING VEHICLES

CROSS-REFERENCE TO RELATED APPLICATION

This application claims the benefit of Korean Patent Application No. 10-2015-0143937, filed on Oct. 15, 2015 in the Korean Intellectual Property Office, the disclosure of which is incorporated herein by reference.

BACKGROUND

1. Field of the Invention

The present invention relates to a vehicle for automatically controlling a proper distance between vehicles traveling in the same direction, and a method for controlling the same.

2. Description of the Related Art

Generally, a vehicle is a mode of transportation which travels on roads or tracks using energy from fossil fuels or electric energy as a power source. With the increasing development of vehicle technology, vehicles having various functions for user convenience have been widely used. Specifically, as the number of vehicles in which electronic components are embedded rapidly increases, an improved vehicle having an active safety system (ASS) operating for accident prevention has recently been developed to prevent the occurrence of traffic accidents.

Recently, many developers are conducting research into a vehicle including an advanced driver assistance system (ADAS) configured to actively provide information regarding a vehicle state, a driver state, and a peripheral environment to reduce manipulation load of a vehicle driver as well as to increase convenience of use.

A representative example of the advanced driver assistance system (ADAS) embedded in vehicles is a smart cruise control (SCC) system. The smart cruise control (SCC) system configured to automatically adjust a proper distance between vehicles (e.g., two vehicles) operates a vehicle that includes the SCC system to automatically accelerate or decelerate to maintain a safe distance between the vehicle and the preceding vehicle, resulting in implementation of automatic travel control.

SUMMARY

Therefore, the present invention provides a vehicle and a method for controlling the same, which may determine a traveling speed based on travel information of a first preceding vehicle and a second preceding vehicle traveling ahead of the first preceding vehicle. Additional aspects of the invention will be set forth in part in the description which follows and, in part, will be obvious from the description, or may be learned by practice of the invention.

In accordance with an aspect of the present invention, a vehicle may include: a drive unit configured to provide rotational force for vehicle traveling; a distance sensor configured to detect an object located in a forward direction of the traveling vehicle; and a controller configured to determine the presence of a first preceding vehicle and a second preceding vehicle located ahead of the first preceding vehicle, which travel on the same traffic road as a traveling road based on the result detected by the distance sensor, and to operate the drive unit to operate the vehicle at a traveling speed determined according to travel information of the first and second preceding vehicles.

The controller may be configured to determine an object present on the traveling road having at least a predetermined first reference width to be the first preceding vehicle based on the detection result of the distance sensor. The controller may further be configured to determine an object present on the traveling road having at least a second reference width acquired by a position of the first preceding vehicle to be the second preceding vehicle, according to the detection result of the distance sensor. When a curvature of the traveling road is less than a predetermined reference curvature, the controller may be configured to determine an object having at least the second reference width during a predetermined reference time to be the second preceding vehicle. The controller may be configured to determine an object having the width increased during the reference time from among a plurality of objects each having at least the second reference width, to be the second preceding vehicle. The controller may also be configured to acquire the second reference width based on a distance to the forward object and the position of the first preceding vehicle.

When a curvature of the traveling road is equal to or greater than a predetermined reference curvature, the controller may be configured to determine an object, several surfaces of which are detected by the distance sensor, having at least the second reference width, to be the second preceding vehicle. When several objects each having at least the second reference width are detected by the distance sensor, the controller may be configured to determine a specific object located closest to the first preceding vehicle to be the second preceding vehicle. The controller may further be configured to operate the drive unit to adjust the speed of the vehicle to be any one of a first traveling speed that corresponds to travel information of the first preceding vehicle and a second traveling speed that corresponds to travel information of the second preceding vehicle. The controller may then be configured to operate the drive unit to adjust the vehicle speed to a lesser one of the first traveling speed and the second traveling speed.

Assuming that a curvature of the traveling road is less than a predetermined first reference curvature, when the first preceding vehicle deviates from the traveling road, the controller may be configured to operate the drive unit to adjust the vehicle speed to a traveling speed determined based on travel information of the first preceding vehicle and the second preceding vehicle.

The controller may be configured to determine whether the first preceding vehicle deviates from the traveling road using a speed and position of the first preceding vehicle obtained from the detection result of the distance sensor. The distance sensor may include a light detection and ranging (LiDAR). The vehicle may further include: an imaging device configured to capture a front-view image, wherein the controller may be configured to acquire information of the traveling road from the front-view image captured by the imaging device.

In accordance with another aspect of the present invention, a method for controlling a vehicle may include: detecting an object located in a forward direction; determining the presence of a first preceding vehicle and a second preceding vehicle, which travel on the same traffic road as a traveling road based on the result detected by the distance sensor; and operating the vehicle at a traveling speed determined based on travel information of the first preceding vehicle and the second preceding vehicle.

The determination of the presence of the first preceding vehicle may include: determining an object present on the traveling road having at least a predetermined first reference width to be the first preceding vehicle based on the detection result. The determination of the presence of the second preceding vehicle may include: determining an object present on the traveling road having at least a second reference width acquired by a position of the first preceding vehicle to be the second preceding vehicle based on the detection result.

Additionally, the determination of the presence of the second preceding vehicle may include: when a curvature of the traveling road is less than a predetermined reference curvature, determining an object having at least the second reference width during a predetermined reference time to be the second preceding vehicle. The determination of the presence of the second preceding vehicle may include: determining an object having the width increased during the reference time from among a plurality of objects each having at least the second reference width, to be the second preceding vehicle.

Further, the determination of the presence of the second preceding vehicle may include: acquiring the second reference width based on a distance to the forward object and the position of the first preceding vehicle; and determining an object present on the traveling road having at least the acquired second reference width to be the second preceding vehicle. The determination of the presence of the second preceding vehicle may include: when a curvature of the traveling road is equal to or greater than a predetermined reference curvature, determining an object having a plurality of detected surfaces and at least the second reference width, to be the second preceding vehicle. The determination of the presence of the second preceding vehicle may include: when several objects each having at least the second reference width are detected, determining a specific object located closest to the first preceding vehicle to be the second preceding vehicle.

The operation of the vehicle or adjustment of the vehicle speed to be a traveling speed determined based on travel information of the first preceding vehicle and the second preceding vehicle may include: acquiring a first traveling speed that corresponds to travel information of the first preceding vehicle; acquiring a second traveling speed that corresponds to travel information of the second preceding vehicle; and operating the vehicle at any one of the first traveling speed and the second traveling speed. The vehicle may also be operated to travel at a lesser one of the first traveling speed and the second traveling speed.

Additionally, the adjustment of the vehicle speed to be a traveling speed determined based on travel information of the first preceding vehicle and the second preceding vehicle may include: assuming that a curvature of the traveling road is less than a predetermined first reference curvature, determining whether the first preceding vehicle deviates from the traveling road; and when the first preceding vehicle deviates from the traveling road, adjusting the vehicle speed to be a traveling speed determined based on travel information of the first preceding vehicle and the second preceding vehicle.

The determination of whether the first preceding vehicle deviates from the traveling road may include: determining whether the first preceding vehicle deviates from the traveling road using a speed and position of the preceding vehicle obtained from the detection result. The detection of the forward object may include: detecting a distance to the first preceding vehicle using a light detection and ranging (LiDAR). The method may further include: acquiring a front-view image using an imaging device. The determination of the presence of the first preceding vehicle and the second preceding vehicle may include: determining the traveling road based on the acquired front-view image; and determining the presence of the first preceding vehicle and the second preceding vehicle traveling on the traveling road.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
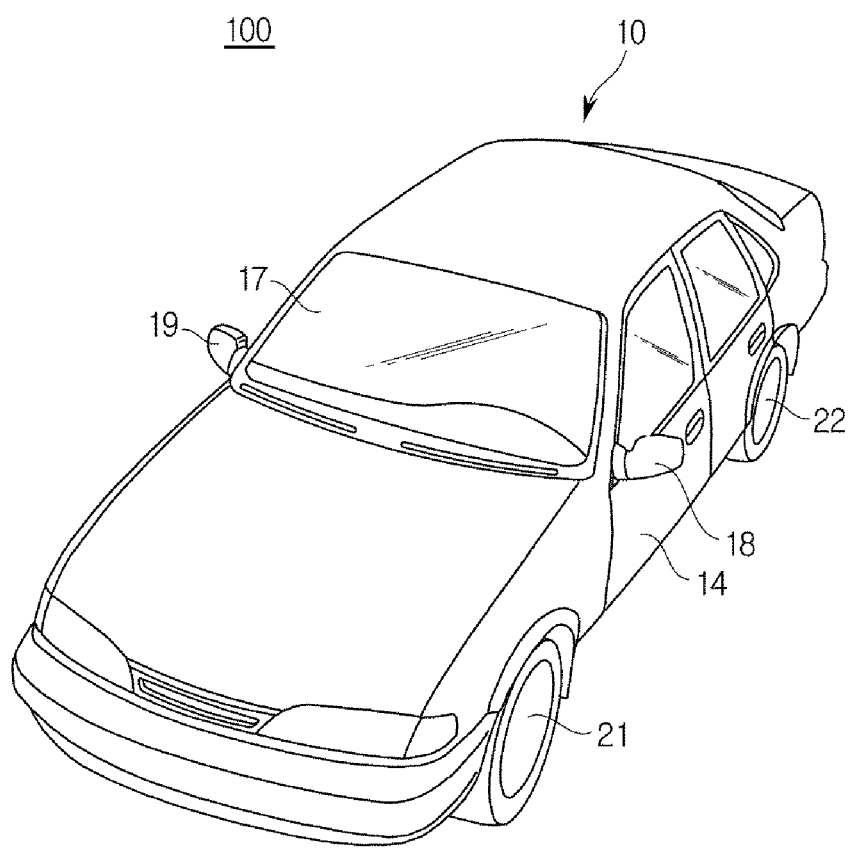
FIG. 1 is a view illustrating a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings, wherein like reference numerals refer to like elements throughout. A vehicle and a method for controlling the same according to exemplary embodiments of the present invention will hereinafter be described with reference to the attached drawings.

FIG. 1 is a view illustrating the appearance of a vehicle according to an exemplary embodiment of the present invention. Referring to FIG. 1, the vehicle 100 according to the embodiment may include a main body 10 that forms the appearance (e.g., external body) of the vehicle 100, vehicle wheels (21, 22) to move the vehicle 100, doors 14 to shield an indoor space of the vehicle 100 from the exterior, a vehicle windshield 17 to provide a forward view of the vehicle 100 to a vehicle driver within the vehicle 100, side-view mirrors (18, 19) to provide a rear view of the vehicle 100 to the vehicle driver, and a controller configured to operate the vehicle.

The wheels (21, 22) may include front wheels 21 disposed at the front of the vehicle and rear wheels 22 disposed at the rear of the vehicle. The front wheels 21 or the rear wheels 22 may be configured to receive rotational force from a drive unit 500 to move the main body 10 moves forward or backward. The doors 14 may be rotatably disposed at the right and left sides of the main body 10 to shield an indoor space of the vehicle 100 from the exterior when the doors 14 are closed.

The windshield 17 may be disposed at a front upper portion of the main body 10 to provide visual information of a forward direction of the vehicle 100. The windshield 17 may also be referred to as a windshield glass. The side-view mirrors (18, 19) may include a left side-view mirror 18 disposed at the left of the main body 10 and a right side-view mirror 19 disposed at the right of the main body 10, to provide obtain visual information of the lateral and rear directions of the vehicle 100.

Figure 2:
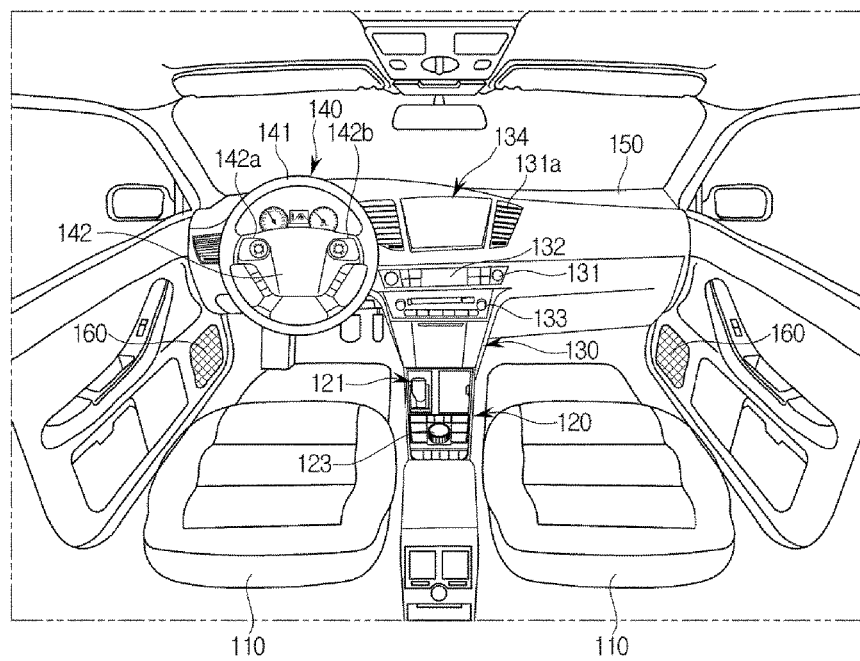
FIG. 2 is a view illustrating the internal structure of the vehicle according to an exemplary embodiment of the present invention.

FIG. 2 is a view illustrating the internal structure of the vehicle according to an exemplary embodiment of the present invention. Referring to FIG. 2, the vehicle 100 may include a seat 110; and a dashboard 150 having a gearbox 120, a center fascia 130, a steering wheel 140, and the like. A gearshift 124 for changing gears of the vehicle 100 may be installed at the gearbox 120. In addition, a dial manipulation unit 122 for allowing a user to control the principal functions of the vehicle 100 may be installed at the gearbox 120. The steering wheel 140 of the dashboard 150 is a device that adjusts a traveling direction of the vehicle 100, may be connected to a rim 141 grasped by a vehicle driver and a steering device of the vehicle 100, and may include a spoke 142 to connect the rim 141 to a hub of a rotation axis for steering. In accordance with one embodiment, the spoke 142 may include various devices embedded within the vehicle 100, for example, manipulation devices (142a, 142b) for operating the audio device, etc.

Further, the center fascia 130 embedded in the dashboard 150 may include an air-conditioner 131, a clock 132, an audio device 133, a display, etc. The air-conditioner 131 may be configured to maintain temperature, humidity, purity, and airflow of indoor air of the vehicle 100 in a comfortable or pleasant condition (e.g., user set condition). The air-conditioner 131 may be installed at the center fascia 130, and may include at least one air outlet 131a through which air may be discharged to the exterior. A button or dial for operating the air-conditioner 131 may be installed at the center fascia 130. A user such as a vehicle driver may operate the air-conditioner 131 of the vehicle using the button or dial mounted to the center fascia 130.

The clock 132 may be disposed proximate to the button or dial for operating the air-conditioner 131. The audio device 133 may include a manipulation panel including a plurality of buttons used to perform functions of the audio device 133. The audio device 133 may provide a radio mode for providing a radio function and a media mode for reproducing audio files stored in various storage media. The display 134 may be configured to display a user interface (UI) with information associated with the vehicle 100 in the form of an image or text for user recognition.

For this purpose, the display 134 may be embedded in the center fascia 130. However, the scope or spirit of installation examples of the display 134 is not limited thereto, and the display 134 may be detachably coupled to the center fascia 130 of the vehicle 100.

The display 134 may be implemented by any one of a liquid crystal display (LCD), a light emitting diode (LED), a plasma display panel (PDP), an organic light emitting diode (OLED), a cathode ray tube (CRT), etc., without being limited thereto. In addition, the dashboard 150 may include various instrument panels on which a vehicle speed, revolutions per minute (rpm) of an engine, and remaining fuel quantity may be displayed, and may further include a glove box in which various objects may be stored.

Meanwhile, the vehicle may include a smart cruise control (SCC) system configured to detect a distance from the vehicle to a first preceding vehicle (Cp1) and automatically adjust a traveling speed based on the determined distance. In particular, the SCC system may include a follow-up function in which a specific distance between the vehicle and a first preceding vehicle (Cp1) may be maintained while the vehicle traveling based on the detection of the first preceding vehicle (Cp1); and a set-speed traveling function in which the vehicle is driven at a specific speed when the first preceding vehicle (Cp1) is not detected, such that the SCC system may operate the vehicle 100.

The vehicle 100 including the SCC system may be configured to determine the traveling speed based on the relationship between the vehicle 100 and the first preceding vehicle (Cp1). In particular, the vehicle may improperly cope with the remaining traveling environment other than the preceding vehicle (Cp1). For example, since the traveling speed of the second preceding vehicle (Cp2) located ahead of the first preceding vehicle (Cp1) is not considered, the vehicle 100 may not maintain the safe distance between the vehicle 100 and the second preceding vehicle (Cp2). Therefore, to determine the traveling speed of the vehicle 100, the controller of the vehicle 100 may be configured to use travel information of the first preceding vehicle (Cp1) and travel information of the second preceding vehicle (Cp2). Definition of the first preceding vehicle (Cp1) and the second preceding vehicle (Cp2) will first be given, and the vehicle 100 configured to determine a traveling speed based on travel information of the first preceding vehicle (Cp1) and the second preceding vehicle (Cp2) will hereinafter be given.

Figure 3:
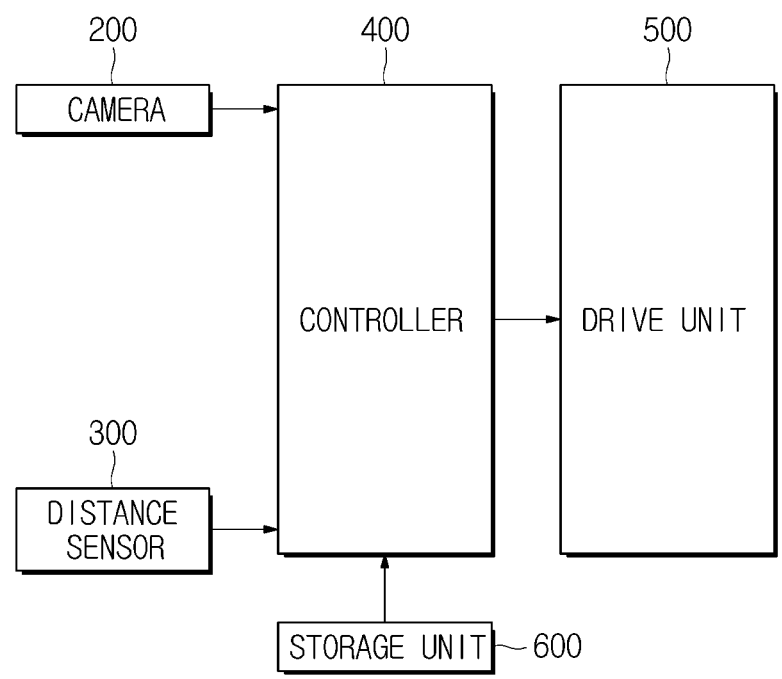
FIG. 3 illustrates a vehicle, a first preceding vehicle, and a second preceding vehicle according to an exemplary embodiment of the present invention.

FIG. 3 illustrates a vehicle, a first preceding vehicle, and a second preceding vehicle according to an exemplary embodiment of the present invention. Referring to FIG. 3, the vehicle 100 may be driven in any one of a plurality of traffic lanes formed on roads, and travel on the selected traffic lane. For convenience of description, the vehicle 100 will hereinafter be referred to as an ego-vehicle, and a traffic lane on which the vehicle 100 travels will hereinafter be referred to as a traveling road (W).

Referring to FIG. 3, some preceding vehicles traveling in the same direction as the subject vehicle 100 may be detected on the traveling road (W). In particular, a specific vehicle located closest to the vehicle 100 from among a plurality of vehicles traveling on the traveling road (W) will hereinafter be referred to as a first preceding vehicle (Cp1). Similarly, a specific vehicle located closest to the first preceding vehicle (Cp1) from among a plurality of vehicles located ahead of the first preceding vehicle (Cp1) will hereinafter be referred to as a second preceding vehicle (Cp2).

The first preceding vehicle (Cp1) and the second preceding vehicle (Cp2) based on the position of the vehicle 100 have been described above. The vehicle 100 configured to determine a traveling speed based on travel information of the first preceding vehicle (Cp1) and the second preceding vehicle (Cp2) will hereinafter be described.

Figure 4:
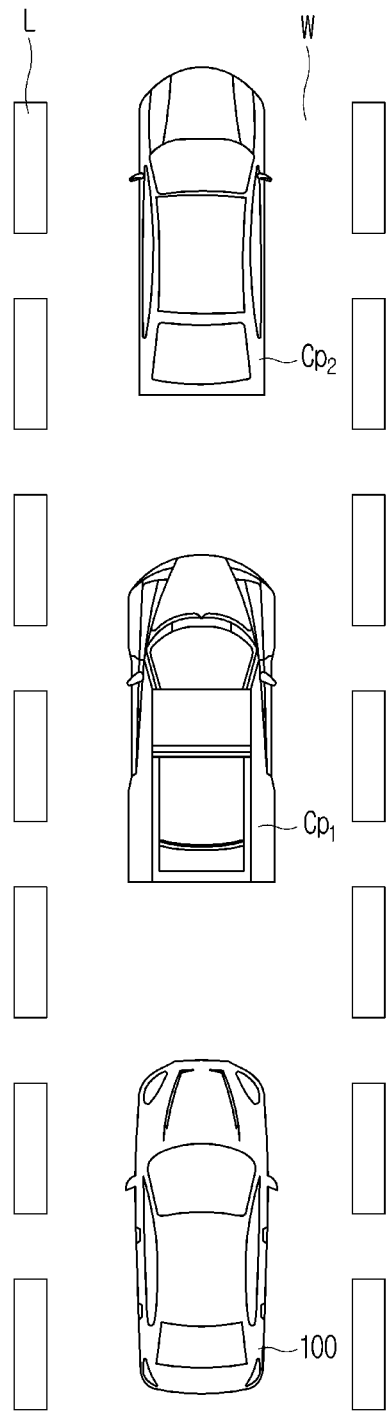
FIG. 4 is a block diagram illustrating a vehicle according to an exemplary embodiment of the present invention.
Figure 5A:
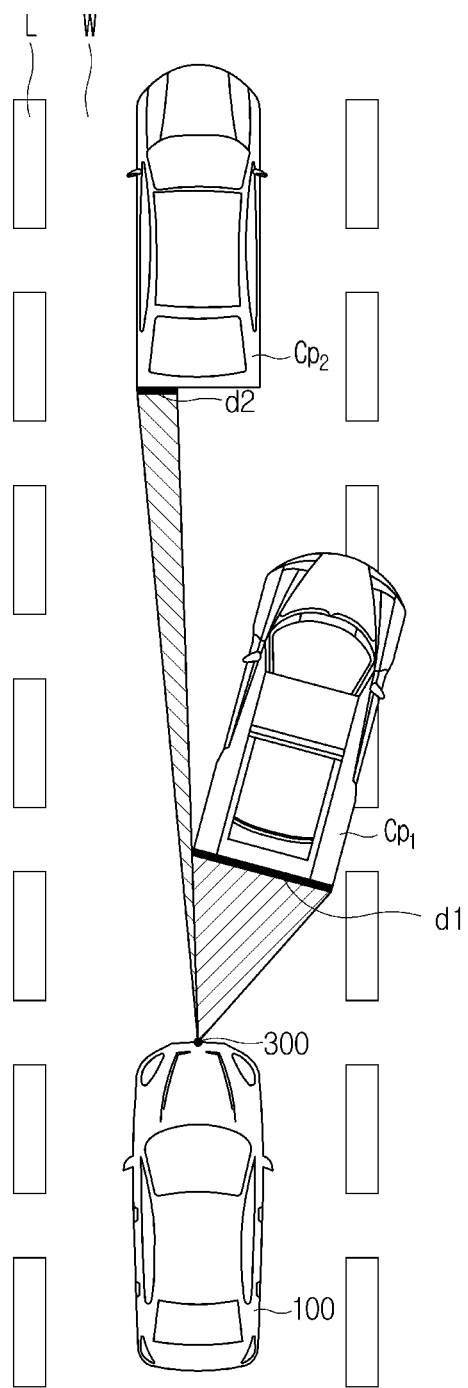
FIGS. 5A and 5B illustrate the sensed results dependent upon the position of preceding vehicles using sensors of a vehicle according to an exemplary embodiment of the present invention.
Figure 5B:
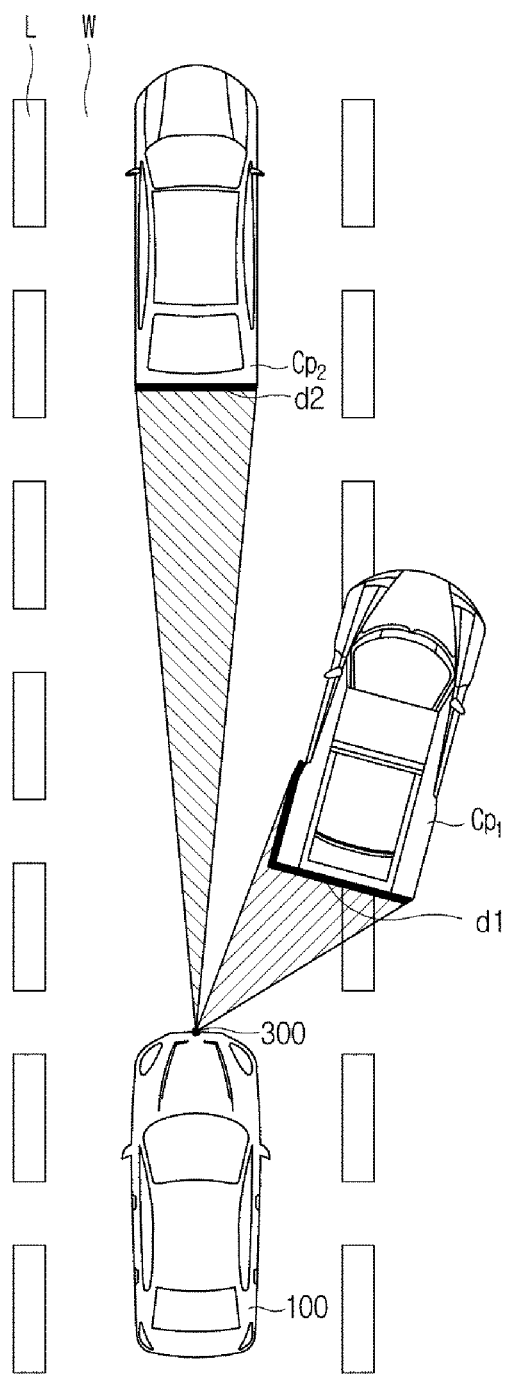
Figure 6:
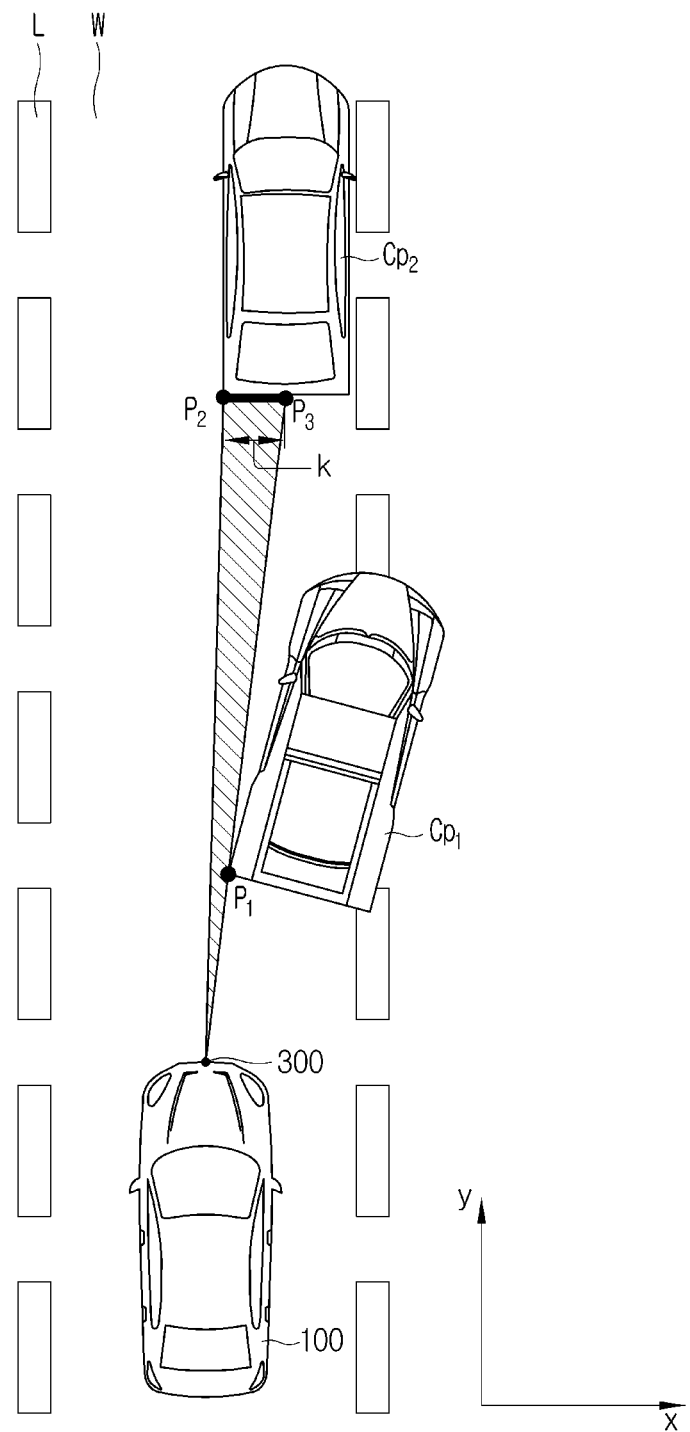
FIG. 6 is a conceptual diagram illustrating a method for determining a second reference width by a controller of a vehicle according to an exemplary embodiment of the present invention.

FIG. 4 is a block diagram illustrating a vehicle according to an exemplary embodiment of the present invention. FIGS. 5A and 5B illustrate the sensed results dependent upon the position of preceding vehicles using sensors of a vehicle according to an exemplary embodiment of the present invention. FIG. 6 is a conceptual diagram illustrating a method for determining a second reference width by a controller of a vehicle according to an exemplary embodiment of the present invention.

Referring to FIG. 4, the vehicle 100 according to the exemplary embodiment may include an imaging device 200 (e.g., a camera, video camera, or the like) configured to capture images in a forward direction of the vehicle 100; a distance sensor configured to detect an object (i.e., a forward object) located in a forward direction of the vehicle 100 (e.g., in the traveling direction of the vehicle); a drive unit 500 configured to provide rotational force to vehicle wheels to allow the vehicle 100 to travel on roads; a controller 400 configured to detect the presence of a first preceding vehicle (Cp1) and a second preceding vehicle (Cp2) based on the detection result of the distance sensor, and to operate the drive unit 500 to adjust a traveling speed to be a speed determined based on travel information of the first preceding vehicle (Cp1) and the second preceding vehicle (Cp2); and a storage unit 600 configured to pre-store information required to operate the vehicle.

The drive unit 500 may be configured to provide rotational force to vehicle wheels to allow the vehicle 100 to travel on roads. The drive unit 500 may be implemented in various ways within the above-mentioned technical scope. For example, the drive unit 500 may be implemented as a motor. The drive unit 500 may be configured to provide rotational force that corresponds to a traveling speed under the operation of the controller 400 to be described later, and as such a detailed description thereof will hereinafter be given.

The vehicle 100 (e.g., operated by the controller) may be configured to determine a traveling speed based on travel information of the first preceding vehicle (Cp1) and the second preceding vehicle (Cp2) located ahead of the first preceding vehicle (Cp1). The imaging device 200 may be configured to acquire a front-view image to determine a traveling road (W) of the vehicle 100. The front-view image captured by the imaging device 200 may include a traveling lane on which the vehicle 100 travels, and a traffic lane (L) forming the traveling lane. To acquire the front-view image, the imaging device 200 may be installed at the front surface of the vehicle 100. The imaging device 200 may include an image pickup sensor, for example, a charge coupled device (CCD) or a complementary metal oxide semiconductor (CMOS). The front-view image captured by the imaging device 200 may be used by the controller 400 configured to determine the traveling road (W).

The distance sensor 300 may be configured to detect objects located in a forward direction of the vehicle 100. For example, the distance sensor 300 may include a first preceding vehicle (Cp1) and a second preceding vehicle (Cp2) traveling in a forward direction of the vehicle 100, a stationary object including a structure or buildings in the vicinity of the traveling vehicles, and a vehicle 100 approaching in the opposite lane (L) from the subject vehicle 100. In addition, the distance sensor 300 may be configured to detect the distance to the object located in a forward direction of the vehicle 100. For example, the distance sensor 300 may be configured to detect the distance between the first preceding vehicle (Cp1) and the second preceding vehicle (Cp2).

For this purpose, the distance sensor 300 of the vehicle 100 according to the exemplary embodiment may be implemented by radar or light detection and ranging (LiDAR). When the distance sensor 300 is implemented by LiDAR, the distance sensor 300 may be configured to irradiate laser light to a predetermined region of a forward direction, and receive laser light reflected from a forward object. In response to receiving the laser light, the distance sensor 300 may be configured to detect physical characteristics, i.e., the distance to the forward object, speed, shape, etc. of the forward object, based on a reception time and intensity of laser light, a frequency change, a polarization change, etc. For convenience of description, it may be assumed that the distance sensor 300 is implemented as LiDAR.

FIGS. 5A and 5B are conceptual diagrams illustrating the sensed results of the first preceding vehicle (Cp1) and the second preceding vehicle (Cp2) according to the position of the first preceding vehicle (Cp1). In FIGS. 5A and 5B, an oblique-lined region may indicate a specific region to which laser light is irradiated by the distance sensor 300.

Assuming that the first preceding vehicle (Cp1) and the second preceding vehicle (Cp2) are detected on the traveling road (W) as shown in FIG. 3, the detection sensor of the vehicle 100 may be configured to irradiate laser light in a forward direction to detect the first preceding vehicle (Cp1). When the first preceding vehicle (Cp1) travels in the same direction as the subject vehicle 100, the distance sensor 300 may be configured to detect a rear surface of the first preceding vehicle (Cp1). In addition, when the preceding vehicle (Cp1) is located on the proceeding route of the laser light, the distance sensor 300 may not detect the second preceding vehicle (Cp2) hidden or blocked by the first preceding vehicle (Cp1).

Meanwhile, the first preceding vehicle (Cp1) may deviate from the traveling road (W) to perform a lane change. Referring to FIG. 5A, the first preceding vehicle (Cp1) may deviate from the traveling road (W) to change from a current lane to a right lane. As a result, the distance sensor 300 may be configured to detect the rear surface of the first preceding vehicle (Cp1) performing lane change, and may be configured to detect some parts of the rear surface of the second preceding vehicle (Cp2) located in front of the first preceding vehicle (Cp1). In FIG. 5A, 'd1' may denote a rear region of the first preceding vehicle (Cp1) detected by the distance sensor 300, and 'd2' may denote a rear region of the second preceding vehicle (Cp2) detected by the distance sensor 300. In particular, 'd2' may be changed by the position of the first preceding vehicle (Cp1).

FIG. 5B illustrates that the first preceding vehicle (Cp1) further moves right as compared to the case of FIG. 5A. It may be confirmed that the rear region of the second preceding vehicle (Cp2) detected by the distance sensor 300 is different from that of FIG. 5A. The sensed result of the distance sensor 300 may be used to determine the presence of the first preceding vehicle (Cp1) and the second preceding vehicle (Cp2) by the controller 400 to be described later. The controller 400 may be configured to determine the presence of the first preceding vehicle (Cp1) and the second preceding vehicle (Cp2) traveling in the same lane as the traveling road (W) based on the sensed result of the distance sensor 300. As described above, the first preceding vehicle (Cp1) and the second preceding vehicle (Cp2) must travel on the same lane as the traveling road (W), to allow the controller 400 to be configured to determine the traveling road (W).

Accordingly, the controller 400 may be configured to use the front-view image captured by the imaging device 200. The controller 400 may further be configured to process the front-view image in a manner that the traffic lane (L) may be clearly shown in the front-view image. As a result, the controller 400 may be configured to extract the left and right lanes located closest to the center part of the front-view image, and determine the formed lane to be the traveling road (W).

When the traveling road (W) is detected, the controller 400 may be configured to determine whether the object located on the traveling road (W) from among the forward objects detected by the distance sensor 300 is the first preceding vehicle (Cp1) or the second preceding vehicle (Cp2). In particular, after the controller 400 first determines the presence of the first preceding vehicle (Cp1), the controller 400 may be configured to determine the presence of the second preceding vehicle (Cp2) using the detected position of the preceding vehicle (Cp1). To detect the first preceding vehicle (Cp1), the controller 400 may be configured to use a first predetermined reference width. Particularly, the first reference width may indicate a minimum width capable of being detected by the vehicle 100 from among a plurality of objects detected by the distance sensor 300. The first reference width may be pre-stored in the storage unit 600, and may be predetermined by a user input signal or the operation result of the controller 400.

When the first preceding vehicle (Cp1) travels in the same direction as the traveling direction of the subject vehicle 100, or when the traveling direction of the first preceding vehicle (Cp1) does not greatly deviate from (e.g., is above the same as) the traveling direction of the subject vehicle 100, the distance sensor 400 may be configured to detect the rear surface of the first preceding vehicle (Cp1). Referring to FIG. 5A, the distance sensor 300 may be configured to detect the rear region (d1) of the first preceding vehicle (Cp1), and 'd1' may be denoted in the form of a straight line. In particular, the length of the straight line (d1) may denote the width of the first preceding vehicle (Cp1).

In contrast, assuming that the first preceding vehicle (Cp1) greatly deviates from the traveling lane of the subject vehicle 100, the distance sensor 300 may be configured to detect some parts of the rear and side surfaces of the first preceding vehicle (Cp1). Referring to FIG. 5B, the distance sensor 300 may be configured to detect the region (d1) including the rear region of the first preceding vehicle (Cp1) and also some parts of the side region of the first preceding vehicle (Cp1), and 'd1' may be formed in an L shape. In particular, any one two straight lines forming the L-shaped region (d1) may indicate the width of the first preceding vehicle (Cp1).

Therefore, the controller 400 may be configured to determine whether the width of the detected object present on the traveling road (W) is equal to or greater than a first reference width, and thus determine the presence of the first preceding vehicle (Cp1). In particular, the controller 400 may be configured to determine whether the width of each object sequentially detected in a forward direction is equal to or greater than the first reference width. As a result, one forward object (e.g., having at least the first reference width) located nearest to the vehicle 100 may be determined to be the first preceding vehicle (Cp1).

When the first preceding vehicle (Cp1) is detected, the controller 400 may be configured to determine the second preceding vehicle (Cp2) based on the position of the first preceding vehicle (Cp1). Referring to FIGS. 5A and 5B, since the detection region (d2) of the second preceding vehicle (Cp2) may be changed based on the position of the first preceding vehicle (Cp1), the controller 400 may be configured to determine the second preceding vehicle (Cp2) based on the position of the first preceding vehicle (Cp1) detected by the controller 400. Particularly, the controller 400 may be configured to determine a specific object having a second reference width detected by the position of the first preceding vehicle (Cp1) to be the second preceding vehicle (Cp2). Accordingly, the controller 400 may be configured to first determine the second reference width using the position of the first preceding vehicle (Cp1).

FIG. 6 exemplary illustrates that the first preceding vehicle (Cp1) moves right, and a method for determining the second reference width will hereinafter be described with reference to FIG. 6. In FIG. 6, it may be assumed that the position of the distance sensor 300 to which laser light is irradiated is the origin for convenience of description and better understanding of the present invention.

The controller 400 may first be configured to acquire coordinates P1(preV_x, preV_y) of a left rear edge based on the acquired image or using for example, a global positioning system (GPS). As shown in FIG. 5A, when the detection region (d1) of the first preceding vehicle (Cp1) is denoted by a substantially straight line, the controller 400 may be configured to set the left edge of the straight line (d1) to 'P1'. In contrast, when the detection region (d1) of the first preceding vehicle (Cp1) is denoted by the L shape as shown in FIG. 5B, the controller 400 may be configured to set an apex of the detection region (d1) to 'P1'. Thereafter, the controller 400 may assume that the second preceding vehicle (Cp2) is located at the rightmost region of the traveling road (W), and may be configured to acquire the left rear edge coordinates P2(pre_preV_x, pre_preV_y) of the second preceding vehicle (Cp2) in the same manner as the previously acquired coordinates.

After acquisition of P1 and P2, the controller 400 may be configured to acquire the intersection points P3(intersec_x, intersec_y) between the straight line ranging from the origin to 'P1' and the position (X=pre_preV_x). Finally, the controller 400 may be configured to determine the distance between P2 and P3 to be the second reference width (k). In particular, the controller 400 may be configured to determine or acquire the second reference width (k) according to the following equation 1.

$$k = abs(\text{intersec\_x} - \text{pre\_preV\_x}) \quad \text{Equation 1}$$

In Equation 1, 'k' may denote the second reference width, 'intersect_x' may denote X coordinates of P3, and 'pre_preV_x' may denote X coordinates of P2.

Although the above-mentioned description has exemplary disclosed that the first preceding vehicle (Cp1) moves right on the traveling lane for convenience of description, the present invention may acquire the second reference width in a similar way to the above-mentioned method even when the first preceding vehicle (Cp1) moves left on the traveling lane. After acquisition of the second reference width, the controller 400 may be configured to determine a specific object (e.g., having at least the second reference width) from among a plurality of detected objects present on the traveling road (W) to be the second preceding vehicle (Cp2).

The controller 400 of the vehicle 100 according to the exemplary embodiment may set a specific object having at least the second reference width at a specific time to the second preceding vehicle (Cp2). In addition, the controller 400 may be configured to determine a specific object capable of maintaining at least the second reference width during a predetermined reference time, to be the second preceding vehicle (Cp2). As a result, the accuracy of detecting the second preceding vehicle (Cp2) may be increased. Particularly, the controller 400 may be configured to determine a specific object, which has at least the second reference width during a predetermined reference time and the detected width is increased, to be the second preceding vehicle (Cp2).

Referring to FIGS. 5A and 5B, as the lane change of the first preceding vehicle (Cp1) is gradually expedited, the detection region (d2) of the second preceding vehicle (Cp2) may be increased in size. Therefore, considering the increase or maintaining of the width, the controller 400 may also be configured to determine the presence of the second preceding vehicle (Cp2) when the first preceding vehicle (Cp1) deviates from the traveling road (W) of the first preceding vehicle (Cp1). In addition, when several objects, each of which has at least the second reference width, are detected, the controller 400 may be configured to determine one object located closest to the first preceding vehicle (Cp1) to be the second preceding vehicle (Cp2). As described above, the second preceding vehicle (Cp2) may be a vehicle traveling ahead of or in front of the first preceding vehicle (Cp1), thus allowing the controller 400 to determine one object located ahead of the first preceding vehicle (Cp1) from among several objects each having at least the second reference width, to be the second preceding vehicle (Cp2).

When the first preceding vehicle (Cp1) and the second preceding vehicle (Cp2) are detected, the controller 400 may be configured to operate the drive unit 500 to adjust the speed of the vehicle 100 to be a traveling speed determined based on travel information of the first preceding vehicle (Cp1) and the second preceding vehicle (Cp2). In particular, the travel information may include various types of information related to traveling, for example, speed, acceleration, position, etc.

Accordingly, the controller 400 may be configured to acquire a first travel speed that corresponds to travel information of the first preceding vehicle (Cp1) and a second travel speed that corresponds to travel information of the second preceding vehicle (Cp2). The controller 400 may specifically be configured to acquire the first travel speed at which a first safe distance to the first preceding vehicle (Cp1) may be maintained, and acquire the second travel speed at which a second safe distance to the second preceding vehicle (Cp2) may be maintained, wherein a safe distance is one in which a collision may be prevented.

Finally, the controller 400 may be configured to operate the drive unit 500 to adjust the vehicle to speed to any one of the first traveling speed and the second traveling speed. In addition, the controller 400 may be configured to operate the drive unit 500 to adjust the vehicle speed to be a lesser one of the first traveling speed and the second traveling speed. As a result, although the first preceding vehicle (Cp1) may deviate from the traffic line, the vehicle 100 may travel while simultaneously maintaining the safe distance to the second preceding vehicle (Cp2), that is, a potential collision may be avoided.

Meanwhile, the controller 400 may be configured to operate the drive unit 500 to adjust the vehicle speed to a traveling speed determined based on travel information of the first preceding vehicle (Cp1) and the second preceding vehicle (Cp2) when the first preceding vehicle (Cp1) deviates from the traveling road (W). To determine whether the first preceding vehicle (Cp1) deviates from the traveling road (W), the controller 400 may be configured to use the speed and position of the first preceding vehicle (Cp1). In particular, the controller 400 may be configured to determine whether the first preceding vehicle (Cp1) deviates from the traveling road (W) using the speed and position of the first preceding vehicle (Cp1) with respect to the traffic lane (L) forming the traveling road (W) obtained through the front-view image. As a result, the vehicle 100 according to the exemplary embodiment may be configured to determine an adaptive traveling speed based on whether the first preceding vehicle (Cp1) deviates from the traveling road.

Heretofore, the exemplary case in which the traveling road (W) is formed in a substantially straight line shape or has a curvature similar to the straight line has been described. Similarly, the controller 400 may also be configured to determine the traveling speed even when the traveling road (W) has a high curvature.

Figure 7:
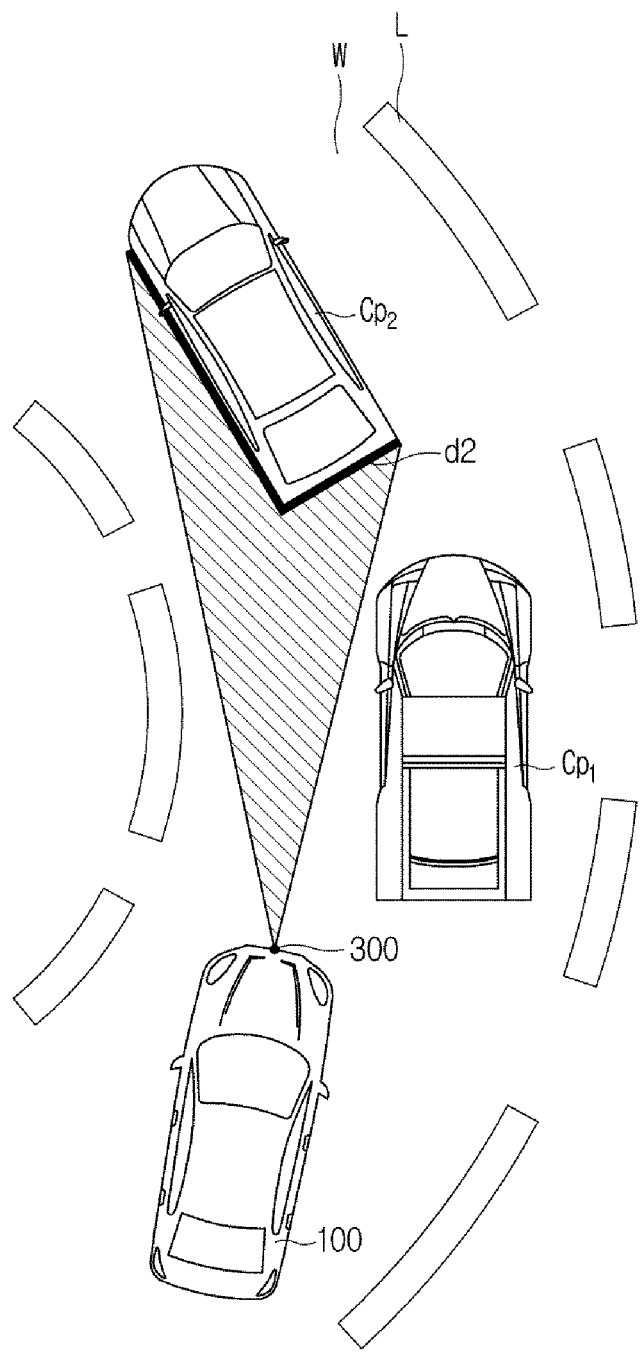
FIG. 7 is a conceptual diagram illustrating the sensed results of a first preceding vehicle and a second preceding vehicle according to the position of the preceding vehicle on a curved road according to an exemplary embodiment of the present invention.

FIG. 7 is a conceptual diagram illustrating the sensed results of a first preceding vehicle and a second preceding vehicle according to the position of the first preceding vehicle on a curved road. As compared to the straight road (W), the vehicle 100 traveling on the curved road (W) may have an increased risk of causing traffic accidents. Therefore, while being driven on the curved road (W), the vehicle 100 may be configured to detect the traveling speed based on traveling speeds of the first preceding vehicle (Cp1) and the second preceding vehicle (Cp2).

When the traveling road (W) is determined, the controller 400 may be configured to determine whether the curvature of the traveling road (W) is equal to or greater than a predetermined reference curvature. In particular, the predetermined reference curvature may indicate a minimum curvature dedicated to the curved road (W). When the curvature of the traveling road (W) is equal to or greater than the predetermined reference curvature, the controller 400 may be configured to determine the second preceding vehicle (Cp2) using a method dedicated to the curved road (W). After the controller 400 detects the first preceding vehicle (Cp1) according to the methods shown in FIGS. 5A, 5B, and 6, the controller 400 may be configured to determine a specific object, several surfaces of which are detected by the distance sensor, from among several objects each having at least the second reference width, to be the second preceding vehicle (Cp2).

Referring to FIG. 7, assuming that the vehicle 100 travels on the curved road (W), the detection region (d2) of the second preceding vehicle (Cp2) detected by the distance sensor may be formed in the L shape. In other words, when the vehicle 100 travels on the curved road (W), the distance sensor may be configured to detect the rear surface of the second preceding vehicle (Cp2) and also one side of the second preceding vehicle (Cp2). When the first preceding vehicle (Cp1) and the second preceding vehicle (Cp2) are detected as described above, the controller 400 may be configured to determine the traveling speed according to the above-mentioned method.

Considering the curvature of the traveling road (W), the vehicle 100 according to the exemplary embodiment may be configured to determine the traveling speed at which the vehicle 100 may maintain a safe distance to other vehicles to avoid collision even when traveling on the curved road. The controller 400 may be implemented by hardware such as a microprocessor, and may also be implemented by software such as the application executed by hardware to perform the above-mentioned operation.

Referring back to FIG. 4, information required to operate the vehicle 100 may be pre-stored in the storage unit 600. For example, a first reference width used to determine the first preceding vehicle (Cp1) may be pre-stored in the storage unit 600. In addition, an algorithm for calculating a second reference width used to determine the second preceding vehicle (Cp2) may also be pre-stored in the storage unit 600. In addition, the storage unit 600 may be configured to pre-store a reference curvature used to determine the curved road (W), and may also be configured to pre-store the above-mentioned reference time.

Each of the storage units (600, 500) may be configured as a flash memory type, a hard disk type, a multimedia card micro type, a card type memory (e.g. a Secure Digital (SD) memory or an eXtreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disc, an optical disc, etc.

Figure 8:
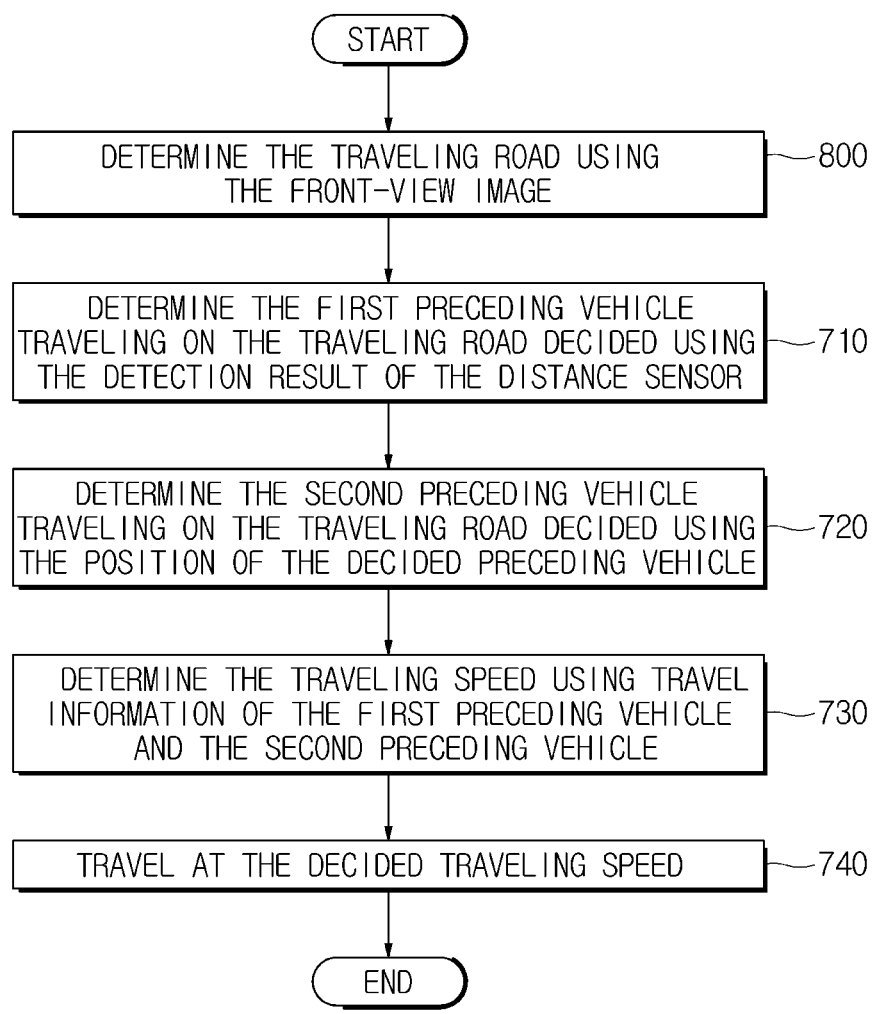
FIG. 8 is a flowchart illustrating a vehicle control method according to an exemplary embodiment of the present invention.

FIG. 8 is a flowchart illustrating a vehicle control method according to an exemplary embodiment of the present invention. Referring to FIG. 8, the vehicle 100 may be configured to detect the traveling road (W) using the front-view image in operation 700. In particular, the imaging device 200 of the vehicle 100 may be configured to acquire the front-view image including information regarding the traveling road, and the controller 400 of the vehicle 100 may be configured to extract a traffic lane through image processing to detect the traveling road (W).

When the traveling road (W) is detected, the vehicle 100 may be configured to determine the first preceding vehicle (Cp1) traveling on the traveling road (W) using the detection result of the distance sensor 300 in operation 710. For this purpose, the controller 400 of the vehicle 100 may be configured to determine an object having at least the first reference width from among several objects present on the traveling road (W) detected by the distance sensor 300 to be the first preceding vehicle (Cp1).

Thereafter, the vehicle 100 may be configured to determine the second preceding vehicle (Cp2) traveling on the traveling road (W) using the position of the detected first preceding vehicle (Cp1) in operation 720. For this purpose, the controller 400 may be configured to acquire a second reference width that corresponds to the position of the first preceding vehicle (Cp1). After acquisition of the second reference width, the controller 400 may be configured to determine a specific object having at least the second reference width, from among several objects present on the traveling road (W) detected by the distance sensor 300, to be the second preceding vehicle (Cp2).

The vehicle 100 may further be configured to determine the traveling speed using travel information of the first preceding vehicle (Cp1) and the second preceding vehicle (Cp2) in operation 730. In particular, the travel information may include various types of information related to traveling, for example, speed, acceleration, position, etc. Finally, the vehicle 100 may be operated to travel at the determined traveling speed in operation 740. As a result, the vehicle 100 according to the exemplary embodiment may maintain the safe distance to each of the first preceding vehicle (Cp1) and the second preceding vehicle (Cp2).

Figure 9:
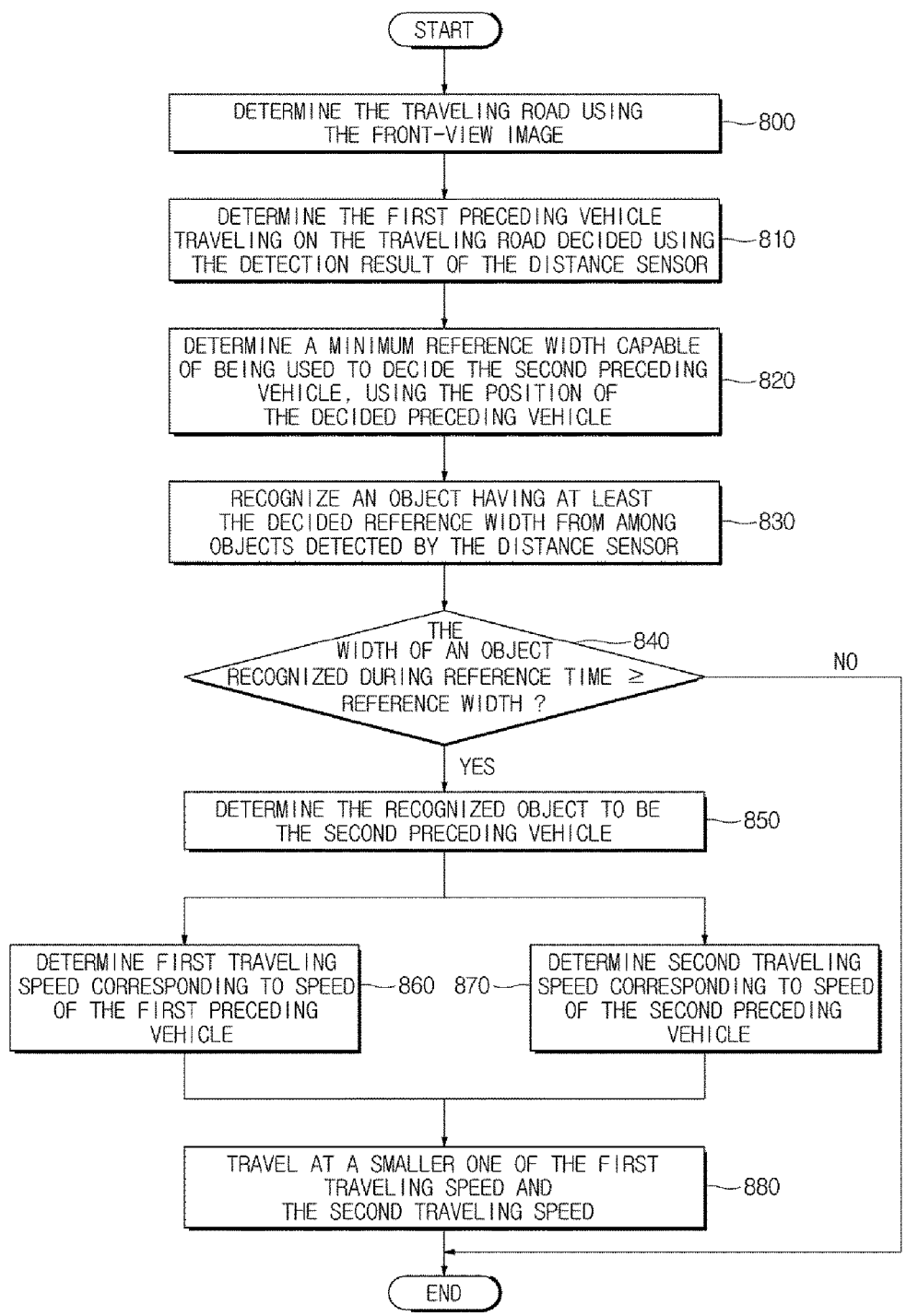
FIG. 9 is a flowchart illustrating a method for controlling vehicles traveling on a straight road according to an exemplary embodiment of the present invention.

Methods for operating the vehicle 100 in different ways according to the case in which the traveling road (W) is shaped in a straight line and the other case in which the traveling road (W) is shaped in a curved line will hereinafter be described. FIG. 9 is a flowchart illustrating a method for controlling vehicles traveling on a substantially straight road according to an exemplary embodiment of the present invention. Referring to FIG. 9, the vehicle 100 may be configured to detect the traveling road (W) using the front-view image in operation 800. In particular, the imaging device 200 of the vehicle 100 may be configured to acquire the front-view image including information of the traveling road, and the controller 400 of the vehicle 100 may be configured to extract a traffic lane through image processing to detect the traveling road (W).

When the traveling road (W) is detected, the vehicle 100 may be configured to determine the first preceding vehicle (Cp1) traveling on the traveling road (W) using the detection result of the distance sensor 300 in operation 810. For this purpose, the controller 400 of the vehicle 100 may be configured to determine an object having at least the first reference width from among several objects present on the traveling road (W) detected by the distance sensor 300 to be the first preceding vehicle (Cp1). The vehicle 100 may be configured to determine a minimum reference width (i.e., a second reference width) capable of being used to detect the second preceding vehicle (Cp2) using the position of the detected first preceding vehicle (Cp1) in operation 820. As shown in FIG. 6, the controller 400 of the vehicle 100 may be configured to confirm the positions of P1, P2, and P3 using the position of the distance sensor 300 as the origin, and may be configured to confirm the second reference width using Equation 1.

When the second reference width is confirmed, the vehicle 100 may be configured to confirm the object having at least the reference width from among several objects detected by the distance sensor 300 in operation 830. In addition, the vehicle 100 may be configured to recognize whether the object confirmed during a reference time has the second reference width or greater in operation 840. When the object recognized during the reference time does not have at least the second reference width, the vehicle 100 may not determine the recognized object to be the second preceding vehicle (Cp2), and may complete the process.

In contrast, assuming that the object recognized during the reference time has at least the second reference width, the vehicle 100 may be configured to determine the recognized object to be the second preceding vehicle (Cp2) in operation 850. Thereafter, the vehicle 100 may be configured to determine a first traveling speed that corresponds to a speed of the first preceding vehicle (Cp1), and at the same time determines a second traveling speed that corresponds to a speed of the second preceding vehicle (Cp2) in operation 870. Finally, the vehicle 100 may be driven at a lesser speed of the first traveling speed and the second traveling speed in operation 880. As a result, the vehicle 100 traveling on the straight road (W) may maintain the safe distance to each of the first preceding vehicle (Cp1) and the second preceding vehicle (Cp2).

Figure 10:
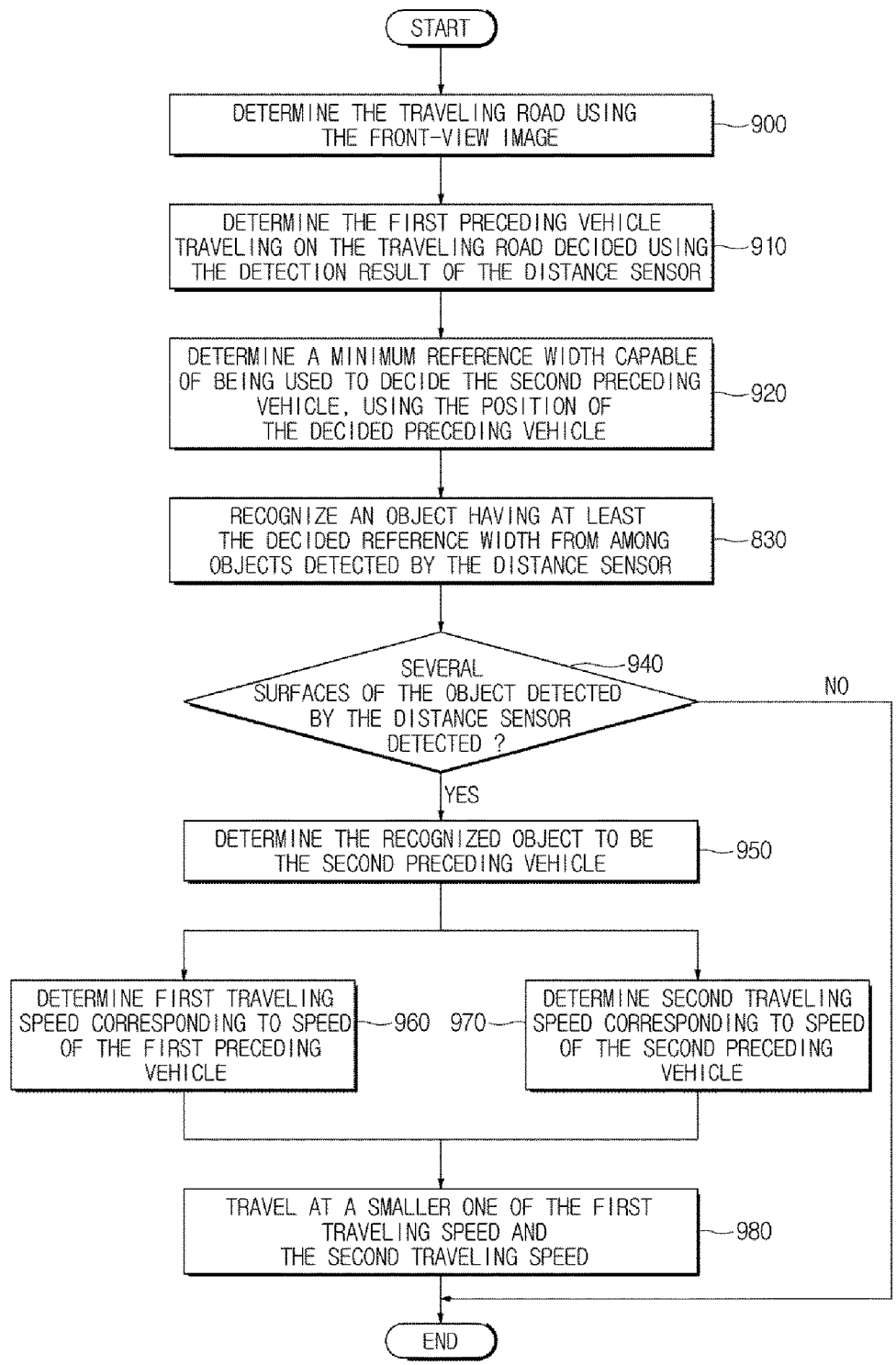
FIG. 10 is a flowchart illustrating a method for controlling vehicles traveling on a curved road according to an exemplary embodiment of the present invention.

FIG. 10 is a flowchart illustrating a method for controlling vehicles traveling on a curved road according to an exemplary embodiment of the present invention. Referring to FIG. 10, the vehicle 100 may be configured to determine the traveling road (W) using the front-view image in operation 900. In particular, the imaging device 200 of the vehicle 100 may be configured to acquire the front-view image including information of the traveling road, and the controller 400 of the vehicle 100 may be configured to extract a traffic lane through image processing to detect the traveling road (W).

When the traveling road (W) is detected, the vehicle 100 may be configured to determine the first preceding vehicle (Cp1) traveling on the traveling road (W) using the detection result of the distance sensor 300 in operation 910. For this purpose, the controller 400 of the vehicle 100 may be configured to determine an object having at least the first reference width from among several objects present on the traveling road (W) detected by the distance sensor 300 to be the first preceding vehicle (Cp1).

The vehicle 100 may further be configured to determine a minimum reference width (i.e., a second reference width) capable of being used to detect the second preceding vehicle (Cp2) using the position of the detected first preceding vehicle (Cp1) in operation 920. As shown in FIG. 6, the controller 400 of the vehicle 100 may be configured to confirm the positions of P1, P2, and P3 using the position of the distance sensor 300 as the origin, and may be configured to confirm the second reference width using Equation 1.

When the second reference width is confirmed, the vehicle 100 may be configured to confirm the object having at least the reference width from among several objects detected by the distance sensor 300 in operation 930. In addition, the vehicle 100 may be configured to recognize whether several surfaces of the recognized object have been detected by the distance sensor 300 in operation 940. When several surfaces of the recognized object are not detected, the vehicle 100 may not determine the confirmed object to be the second preceding vehicle (Cp2), and may complete the process.

In contrast, assuming that several surfaces of the recognized object are detected, the vehicle 100 may be configured to determine the recognized object to be the second preceding vehicle (Cp2) in operation 950. Thereafter, the vehicle 100 may be configured to determine a first traveling speed that corresponds to a speed of the first preceding vehicle (Cp1), and at the same time may be configured to determine a second traveling speed that corresponds to a speed of the second preceding vehicle (Cp2) in operation 970. Finally, the vehicle 100 may be operated at a lesser speed of the first traveling speed and the second traveling speed in operation 980. As a result, the vehicle 100 traveling on the straight road (W) may maintain a safe distance to each of the first preceding vehicle (Cp1) and the second preceding vehicle (Cp2).

As is apparent from the above description, the vehicle and the method for controlling the same according to the exemplary embodiments may determine a traveling speed based on travel information of a first preceding vehicle and a second preceding vehicle located ahead of the first preceding vehicle, resulting in increased safety of autonomous traveling of vehicles.

Specifically, when the second preceding vehicle travels at lower speed than the first preceding vehicle, although the first preceding vehicle abruptly changes from a current traveling road to another road, the vehicle and the method for controlling the same according to the exemplary embodiments may determine a traveling speed according to travel information of the second preceding vehicle, to provide the safe traveling environment to a vehicle driver.

Although exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A vehicle, comprising:
a drive unit configured to provide rotational force for vehicle traveling;
a distance sensor configured to detect one or more objects located in a forward direction of a subject vehicle; and
a controller configured to determine the presence of a first preceding vehicle and a second preceding vehicle located ahead of the first preceding vehicle, which travel on the same traffic road as a traveling road of the subject vehicle based on the result detected by the distance sensor, and to operate the drive unit to adjust vehicle speed of the subject vehicle to be at a traveling speed detected based on travel information of the first preceding vehicle and the second preceding vehicle,
wherein the controller is configured to determine a first object present on the traveling road having at least a predetermined first reference width to be the first preceding vehicle according to the detection result of the distance sensor,
wherein the controller is configured to determine a second object present on the traveling road having at least a second reference width acquired by a position of the first preceding vehicle to be the second preceding vehicle, according to the detection result of the distance sensor, and
wherein the controller is configured to determine the second object having a width equal to or larger than the second reference width, the width gradually increasing during a predetermined reference time, to be the second preceding vehicle.

2. The vehicle according to claim 1, when a curvature of the traveling road is less than a predetermined reference curvature, the controller is configured to determine the second object having a width equal to or larger than the second reference width, the width gradually increasing during the predetermined reference time, to be the second preceding vehicle.

3. The vehicle according to claim 1, wherein the controller is configured to acquire the second reference width based on a distance to the second object and the position of the first preceding vehicle.

4. The vehicle according to claim 1, wherein when a curvature of the traveling road is equal to or greater than a predetermined reference curvature, the controller is configured to determine the second object, several surfaces of which are detected by the distance sensor, having at least the second reference width, to be the second preceding vehicle.

5. The vehicle according to claim 1, wherein when several objects each having at least the second reference width are detected by the distance sensor, the controller is configured to determine a specific object located closest to the first preceding vehicle to be the second preceding vehicle.

6. The vehicle according to claim 1, wherein the controller is configured to operate the drive unit to adjust the vehicle speed to be at any one of a first traveling speed that corresponds to travel information of the first preceding vehicle and a second traveling speed that corresponds to travel information of the second preceding vehicle.

7. The vehicle according to claim 6, wherein the controller is configured to operate the drive unit to adjust the vehicle speed to be at a lesser one of the first traveling speed and the second traveling speed.

8. The vehicle according to claim 1, wherein when a curvature of the traveling road is less than a predetermined first reference curvature and the first preceding vehicle deviates from the traveling road, the controller is configured to operate the drive unit to adjust the vehicle speed to be at a traveling speed determined based on travel information of the first preceding vehicle and the second preceding vehicle.

9. The vehicle according to claim 8, wherein the controller is configured to determine whether the first preceding vehicle deviates from the traveling road using a speed and position of the first preceding vehicle obtained from the detection result of the distance sensor.

10. The vehicle according to claim 1, wherein the distance sensor includes a light detection and ranging (LiDAR).

11. The vehicle according to claim 1, further comprising:
an imaging device configured to capture a front-view image,
wherein the controller is configured to acquire information regarding the traveling road from the front-view image captured by the imaging device.

12. A method for controlling a vehicle, comprising:
detecting, by a controller, one or more objects located in a forward direction of a subject vehicle;
determining, by the controller, the presence of a first preceding vehicle and a second preceding vehicle, which travel on the same traffic road as a traveling road of the subject vehicle based on the result detected by the distance sensor; and
adjusting, by the controller, vehicle speed of the subject vehicle to be at a traveling speed determined based on travel information of the first preceding vehicle and the second preceding vehicle, wherein the determination of the presence of the first preceding vehicle includes:
determining, by the controller, a first object present on the traveling road having at least a predetermined first reference width to be the first preceding vehicle according to the detection result,
wherein the determination of the presence of the second preceding vehicle includes:
determining, by the controller, a second object present on the traveling road having at least a second reference width acquired by a position of the first preceding vehicle to be the second preceding vehicle, according to the detection result,
wherein the determination of the presence of the second preceding vehicle includes:
determining, by the controller, the second object having a width equal to or larger than the second reference width, the width gradually increasing during a predetermined reference time, to be the second preceding vehicle.

13. The method according to claim 12, wherein the determination of the presence of the second preceding vehicle includes:
when a curvature of the traveling road is less than a predetermined reference curvature, determining, by the controller, the second object having a width equal to or larger than the second reference width, the width gradually increasing during a predetermined reference time, to be the second preceding vehicle.

14. The method according to claim 12, wherein the determination of the presence of the second preceding vehicle includes:
acquiring, by the controller, the second reference width based on a distance to the second object and the position of the first preceding vehicle; and
determining, by the controller, the second object present on the traveling road having at least the acquired second reference width to be the second preceding vehicle.

15. The method according to claim 12, wherein the adjustment of the vehicle speed to be at a traveling speed determined based on travel information of the first preceding vehicle and the second preceding vehicle includes:
acquiring, by the controller, a first traveling speed that corresponds to travel information of the first preceding vehicle;
acquiring, by the controller, a second traveling speed that corresponds to travel information of the second preceding vehicle; and
adjusting, by the controller, the vehicle speed to be at any one of the first traveling speed and the second traveling speed,
wherein the adjustment of the vehicle speed to be at any one of the first traveling speed and the second traveling speed includes:
adjusting, by the controller, the vehicle speed to be at a lesser one of the first traveling speed and the second traveling speed.

16. The vehicle according to claim 12, wherein the adjustment of the vehicle speed to be at a traveling speed determined based on travel information of the first preceding vehicle and the second preceding vehicle includes:
when a curvature of the traveling road is less than a predetermined first reference curvature, determining, by the controller, whether the first preceding vehicle deviates from the traveling road; and when the first preceding vehicle deviates from the traveling road, adjusting, by the controller, the vehicle speed to be at a traveling speed determined based on travel information of the first preceding vehicle and the second preceding vehicle,
wherein the determination of whether the first preceding vehicle deviates from the traveling road includes:
determining, by the controller, whether the first preceding vehicle deviates from the traveling road using a speed and position of the first preceding vehicle obtained from the detection result.

\* \* \* \* \*